United States Patent [19]

Moroto et al.

[11] Patent Number: 5,513,719
[45] Date of Patent: May 7, 1996

[54] HYBRID VEHICLE

[75] Inventors: Shuzo Moroto; Kozo Yamaguchi; Shigeo Tuzuki; Yoshinori Miyaish, all of Aichi, Japan

[73] Assignee: Kabushikikaisha Equos Research, Japan

[21] Appl. No.: 202,599

[22] Filed: Feb. 28, 1994

[30] Foreign Application Priority Data

May 24, 1993 [JP] Japan .................... 5-145767

[51] Int. Cl.$^6$ .................................... B60L 11/14
[52] U.S. Cl. .................... 180/65.4; 180/65.6; 60/718
[58] Field of Search ................... 180/65.3, 65.4, 180/65.6, 65.7, 65.2, 69.6; 60/713, 716, 718; 123/2, 3

[56] References Cited

U.S. PATENT DOCUMENTS 5,323,868 6/1994 Kawashima ................... 180/65.4
5,327,992 7/1994 Boll ................................. 180/65.2
5,343,970 9/1994 Severinsky ..................... 180/65.6
5,346,031 9/1994 Gardner ......................... 180/65.4

FOREIGN PATENT DOCUMENTS

0528412 2/1993 European Pat. Off. ........ 180/65.4
4124479 1/1993 Germany ....................... 180/65.4
4297330 10/1992 Japan .

*Primary Examiner*—Anne Marie Boehler
*Attorney, Agent, or Firm*—Lorusso & Loud

[57] ABSTRACT

A hybrid vehicle having an internal combustion engine, a generator connected with an output shaft extending from the internal combustion engine, an electric motor axially aligned with the output shaft, an output gear assembly connected to an output shaft driven by the rotor of the electric motor and positioned between the generator and the electric motor, a clutch adapted to connect and disconnect the generator to/from the output gear assembly, a differential gear unit, and a counter shaft oriented in parallel the output shaft driven by the rotor.

19 Claims, 6 Drawing Sheets

HYBRID VEHICLE

BACKGROUND OF THE INVENTION

1. Field of the Invention

This invention relates to a vehicle having a hybrid power source operationally combining an internal combustion engine, such as a gasoline engine, diesel engine or gas-turbine engine, with an electric motor operating off current stored in a battery mounted in the vehicle and, more particularly, to an assembly including the internal combustion engine, a generator and the electric motor in a hybrid vehicle.

2. Description of the Related Art

The present invention can be applied both to a series type assembly and a parallel type assembly. Three types of hybrid arrangement are known. The first type is the series type assembly in which the hybrid vehicle moves under power of the electric motor operating on current generated by the generator driven by the internal combustion engine which is constantly running. The second type is the parallel type assembly in which both the internal combustion engine and the electric motor are arranged to relate to the drive wheels, but are selectively used. The third type is the series-parallel type assembly combining the series type and parallel type assemblies.

The conventional hybrid vehicle of the series type assembly has the internal combustion engine and the generator integrally combined and the electric motor or an electric motor and transmission unit separated therefrom. A motor vehicle typically mounts the electric motor and the transmission at its front portion, the internal combustion engine and the generator at its rear and the battery intermediate the front and rear.

However, in a passenger car, the internal combustion engine (with the generator), provided at the front of the vehicle, is cooled by ram air. Accordingly, the battery should be located either at the intermediate or rear portion of the vehicle. In consideration of providing sufficient interior space for passengers and a practical traveling distance on one battery charge, several batteries are typically arranged at the rear portion of the vehicle.

It has therefore been preferable to install the electric motor and the transmission unit at the front of the vehicle in a total plan for weight balance and interior space for passengers.

A certain clearance between the internal combustion engine and generator unit and the electric motor and transmission unit should be provided because the two units should be mounted in the vehicle separately to appropriately relate to different drive components and systems causing vibration, which separation requires a large space for the internal combustion engine, generator, electric motor and transmission unit in the vehicle. In the series type hybrid vehicle, such a disadvantage is conspicuous due to a relatively large generator, so that an arrangement aligning the internal combustion engine, generator, electric motor and transmission all together in an engine compartment at the front of the vehicle is impossible.

Even if such an arrangement could be fit into the engine compartment, somehow or other, the steering angle required for the front wheels to turn requires a large clearance circle and further requires separate cases for the internal combustion engine, generator, electric motor and transmission unit, which results in an increase in the number of parts, in weight and in the cost for manufacturing.

Giving precedence to the internal combustion engine and the generator, the electric motor and the transmission unit are difficult to locate at the central portion of the vehicle, whereby the differential gear unit receiving driving power from the electric motor also tends to be located off-center of the vehicle, so that shafts laterally and oppositely extending from the differential gear unit have different lengths which causes a torque on the steering.

SUMMARY OF THE INVENTION

An object of the present invention is to arrange the generator and the electric motor in alignment and within an integrated case to reduce the required longitudinal dimension of the hybrid vehicle.

To attain the foregoing object, a hybrid vehicle according to the present invention has: (a) an internal combustion engine; (b) a generator connected with an output shaft extending from the internal combustion engine, the generator including a magneto stator and a rotor driven by the magneto stator; (c) an electric motor axially aligned with the output shaft extending from the internal combustion engine, the electric motor including a magneto stator and a rotor driven by the magneto stator; (d) an output gear assembly connected to an output axle shaft driven by the rotor of the electric motor and located between the generator and the electric motor; (e) a clutch adapted to connect and disconnect the generator to/from the output gear assembly; (f) a differential gear unit; and (g) a counter shaft oriented in parallel to the output shaft related to the rotor, the counter shaft including gears transmitting a torque from the output gear assembly to the differential gear unit.

The output shaft related to the rotor of the electric motor is provided with an automatic transmission unit after the rotor of the electric motor, so that the rotational speed of the rotor of the electric motor is transmitted to the output shaft connected with the output gear assembly. The automatic transmission unit includes at least one planetary gear unit and is arranged to operate as an under-drive unit.

The automatic transmission unit should also include a hydraulic wet clutch.

The output shaft from the internal combustion engine is connected with the rotor of the generator through a damper.

The generator includes a speed-increasing gear assembly in the interior thereof, so that the rotational speed of the output shaft of the internal combustion engine is accelerated and transferred to the rotor of the generator. The speed-increasing gear assembly of the generator is in the form of a planetary gear unit. Furthermore, the output shaft from the internal combustion engine is connected with the speed-increasing gear assembly of the generator through a damper.

The output gear assembly arranged between the generator and the electric motor is smaller in size than both the generator and the electric motor.

The generator, the electric motor and the output gear assembly are arranged to be received all together in an integrated casing. The integrated casing is abutted against the internal combustion engine. The integrated casing includes three members, the first member being adapted to receive the generator, the second member being adapted to receive the output gear assembly, and the third member being adapted to receive the electric motor. The stator of the generator should be fixed to the first member of the case and the stator of the electric motor is fixed to the third member of the case.

The clutch is preferably a hydraulic wet clutch.

According to the present invention, the generator, electric motor and transmission unit are aligned with an output shaft extending from the internal combustion engine and all are received in the integrated casing, whereby a single anti-rattle means is sufficient due to the unified vibration generated by them. The integrated arrangement of the internal combustion engine and the electric motor does not require a space between them to prevent interference but, rather, minimizes the longitudinal dimensions thereof.

Furthermore, the rotation of the internal combustion engine is mainly transmitted to the generator and that of the electric motor goes to the differential gear unit via the transmission gear unit and the output shaft located in the central portion of the casing, so that the power transmitting path is short and the shafts laterally and oppositely extending from the differential gear unit have the same length to avoid torque on the steering and thereby improve reliability of power transmission.

Because the generator is secured on the integrated casing adjacent the internal combustion engine, the rotor thereof can be securely and rotatably supported at both ends.

The integrated casing housing the generator, electric motor and transmission gear unit and the shortened power transmitting path contribute to a decrease in the number of parts, in weight and in manufacturing cost.

Use of a generator in place of a torque converter in a front-wheel front-drive vehicle, allows the system according to the present invention to be manufactured in already existing facilities for assembling transmission units. The shafts conventionally applied to the differential gear unit can be replaced to easily start production line work.

As the electric motor is located spaced from the internal combustion engine, design of the electric motor may be freely changed without changing the arrangement of the internal combustion engine and generator.

With optional provision of a clutch between the generator and the transmission unit, the series type hybrid vehicle can be used in high speed cruising, just as a parallel type vehicle and, if necessary, the vehicle can be propelled without the generator.

By providing a speed increasing gear assembly inside of the rotor, the generator offers the advantages of shortening the axial length and allowing generation of an effectively higher voltage by the generator.

Locating the transmission unit inside of the rotor of the electric motor provides the advantages of shortening the longitudinal length and not restricting design of the electric motor since there are no limitations dictating radial or longitudinal dimensions.

DETAILED DESCRIPTION OF THE PREFERRED EMBODIMENT(S)

A first preferred embodiment of the present invention will now be described with reference to FIGS. 1 and 2.

An engine compartment provided at a front portion of the vehicle houses an internal combustion engine (hereinafter referred to as "engine") 1, such as a gasoline or diesel engine, which is transversely mounted, and a hybrid unit 2, which replaces a conventional automatic-transmission unit and receives output of the engine 1. The hybrid unit 2 has an integral case 3 which abuts one end of the engine and is defined by three sections (3A, 3B, 3C). Case 3 houses a generator 6, a clutch 7, a two-speed automatic transmission unit 9 and an electric motor in alignment with output shaft 1a of the engine 1. A differential gear unit 11 is mounted under the case 3.

The generator 6 is provided, in place of the torque converter of the conventional automatic transmission unit, adjacent to the engine 1 in a generator housing 3A forming one section of the integral case 3. The generator 6 has a stator coil 12 fixed to the housing and a rotor 15 connecting to the output axle 1a via a damper 13. The damper 13, located radially inward of the stator coil 12, includes an input element 13a connected to the output axle 1a, an output element 13b connected to the rotor 15 and plural springs 13c provided therebetween. The rotor 15 includes a boss portion 15a, a hub 15b and a magnetic member 15c wound around the outer circumferential surface of the hub. The hub 15b is secured to the damper 13 and the boss 15a has a cylindrical shape and is fitted over a spline shaft 17.

The clutch 7 is a hydraulic-wet multiple disk clutch having an input section connected to the spline shaft 17 and an output section connected to an intermediate shaft 21 extending toward the automatic transmission unit 9. The intermediate shaft 21 is rotatably supported in a cylindrically shaped output axle 22 which, in turn, is connected to a counter drive gear 23 at its distal end near the clutch 7. As can be seen from FIG. 2, the clutch 7 and the counter drive gear 23 are arranged near the central portion of the case 3 or, more particularly, in central case section 3B, i.e. in an area encircled by an annular flange 3a (shown partially cut off). At the forward end of the annular flange 3a, there is attached a pump case 19 adjacent a side wall of the generator housing 3A. The pump case 19 houses an internal gear pump for supplying a hydraulic fluid to clutches 7 and C2 and to a brake B and for lubricating moving parts of the hybrid unit 2.

The two-speed automatic transmission unit 9 includes an under-drive mechanism (U/D) with a single planetary gear unit 25 including a ring gear R, which is connected to the intermediate shaft 21, and a carrier CR fixed to the output shaft 22. A direct clutch C2, in the form of a hydraulic-wet multiple disk clutch, is arranged between the carrier CR and a sun gear S. A hydraulic multiple disk type brake B for slow speed and a one-way clutch F are arranged in parallel between the sun gear S and the case section 3B.

The electric motor 10 is a hollow motor, such as a brush-less DC motor, induction motor or direct current shunt motor, and is mounted in a motor case section 3C, isolated from the engine 1. The electric motor 10 is defined by a flat stator 26 and a flat rotor 27, the stator 26 being secured to the inner wall surface of the motor case section 3C and wound with a coil 28, and the rotor 27 being connected to the intermediate shaft 21 and the ring gear R of the planetary gear unit 25. The electric motor 10 defines a large central interior space A for accommodating the two-speed automatic transmission unit 9. Incidentally, the transmission unit 9 is not housed entirely within central space A, but extends into the case section 3B.

In the lower portion of the generator housing 3A and the case section 3B, is mounted a counter shaft 29 with output to differential gear unit 11. The counter shaft 29 is provided with a counter driven gear 30, meshing with the drive gear 23, and a pinion gear 31. The differential gear unit 11 further comprises a ring gear 32 meshing with the pinion gear 31 to transmit torque to the laterally extending front shafts 33a and 33b, respectively, in different ratios, from the ring gear 32. Incidentally, in a sectional end view, the spline shaft 17 (21, 22), the counter shaft 29 and two front shafts 33a, 33b would be seen oriented at respective vertexes of a triangle.

As can be seen from the drawings, the radii of the counter drive 23 and of the clutch 7 are smaller than those of the generator 6 and the electric motor 10 and the outer diameter of the annular flange 3a encircling them is smaller than those of the generator housing 3A and the motor case 3C. The pinion gear 31 secured to the counter shaft 29 is arranged close to the clutch 7 and, more particularly, centered between the two shafts 33a and 33b. The pinion gear 31 is meshed with the ring gear 32 securely attached to differential case 11a of the differential gear unit 11 which, in turn, is centered between the two shafts 33a and 33b driving, respectively, wheels 49a and 49b.

The boss 15a of the generator 6 is rotatably supported by a slide bearing 35 at its forward end and by the splined shaft 17 through a cap 36 at its rear end. The splined shaft 17 is supported in a sleeve 19a, extending at one end through the pump case 19, through sliding bearings 37, 39. Accordingly, the boss 15a can be supported, at its forward end, on the rigidly mounted pump case 19 and, at its rear end, by the splined shaft 17 at two points. It should be understood that as the splined shaft 17 and the rotor 15 are connected to rotate as a single unit, the rotor 15 does not rotate relative to the splined shaft 17.

Lubricating oil is fed through a central oil path 41 of the intermediate shaft 21, through an oil path 40 of the motor case 3C and through plural radially extending holes 41a in the intermediate shaft 21 and also into lubricating oil path 42 of the pump case 19. The lubricating oil from the oil path 42 flows through a gap a between the splined shaft 17 and the sleeve 19a to lubricate the sliding bearings 37, 39, through a hole b to a sliding bearing 35 and through a hole d and a center hole e of the shaft 17 to the cap 36 (See, FIGS. 2 and 7).

Since the generator 6, the electric motor 10 and the automatic transmission unit 9 are installed all together in the case 3, a single lubricating pool is sufficient to lubricate and cool the generator 6 as well as the automatic 10 transmission unit 9.

Figure 1:
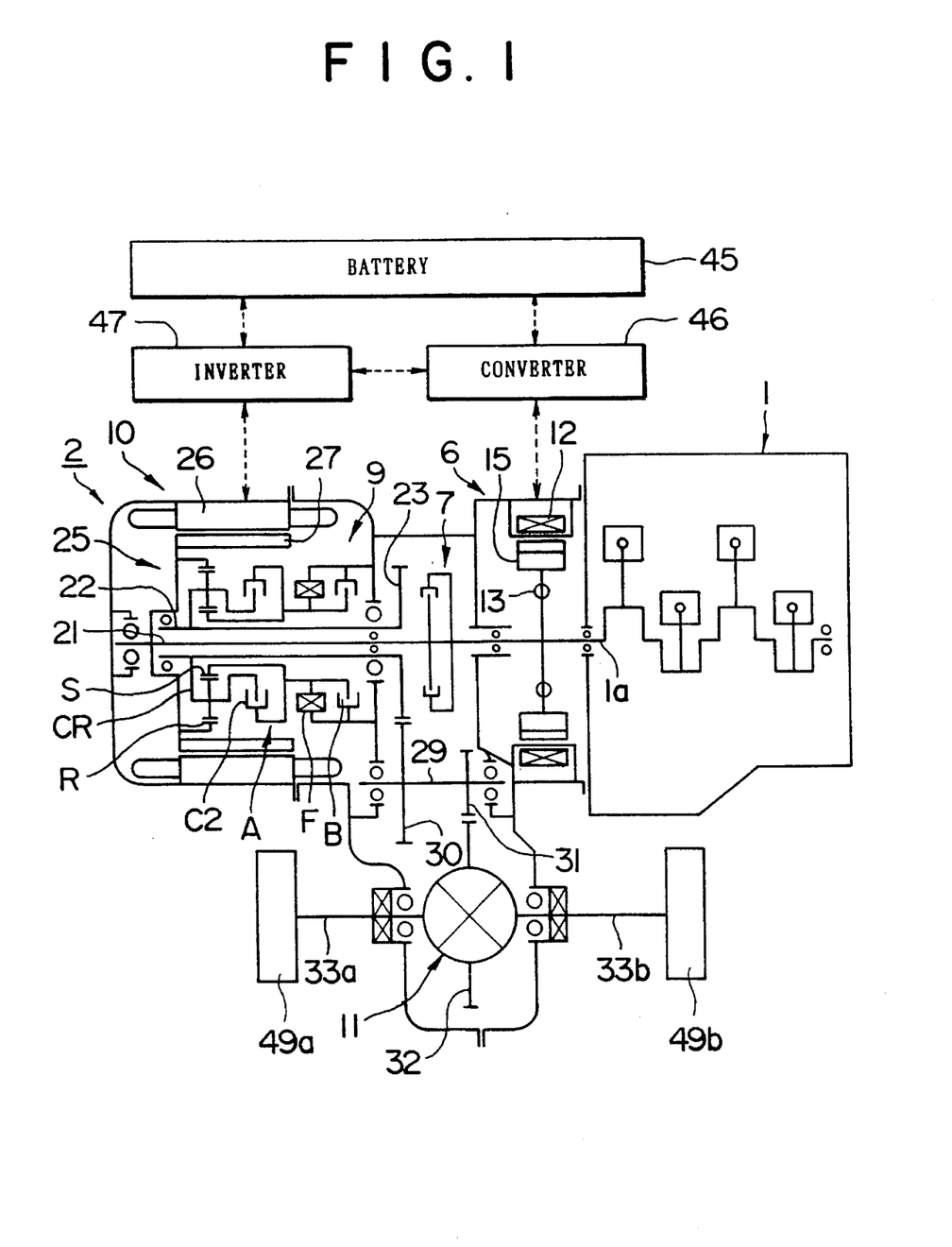
FIG. 1 is a schematic view of the hybrid unit according to a first embodiment of the present invention.
Figure 2:
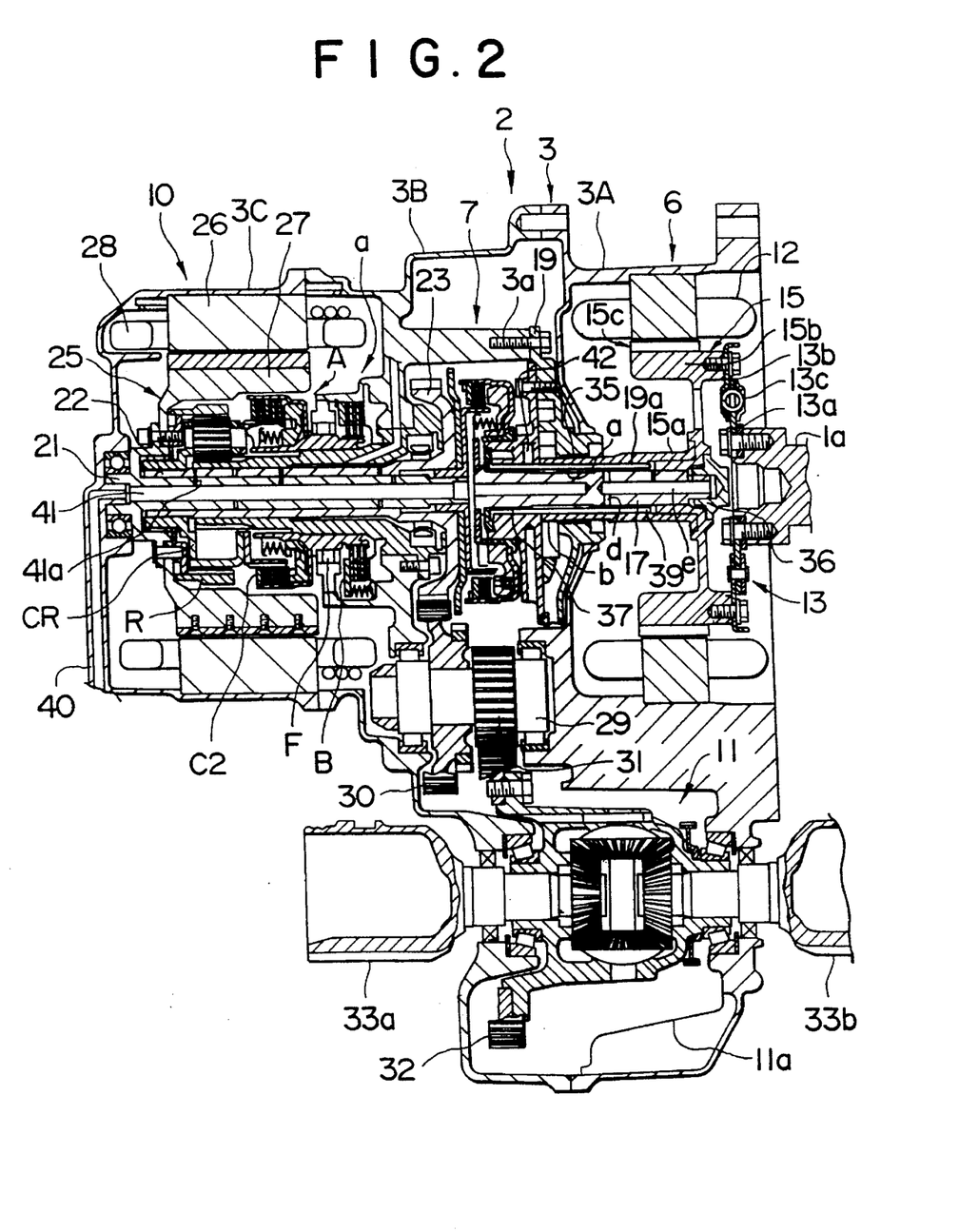
FIG. 2 is a sectional view of the first embodiment.

Incidentally, FIG. 1, also shows a battery 45, a converter 46 for conversion of alternating current into direct current and an inverter 47 for controlling the electrical current to the electric motor 10.

Figure 6:
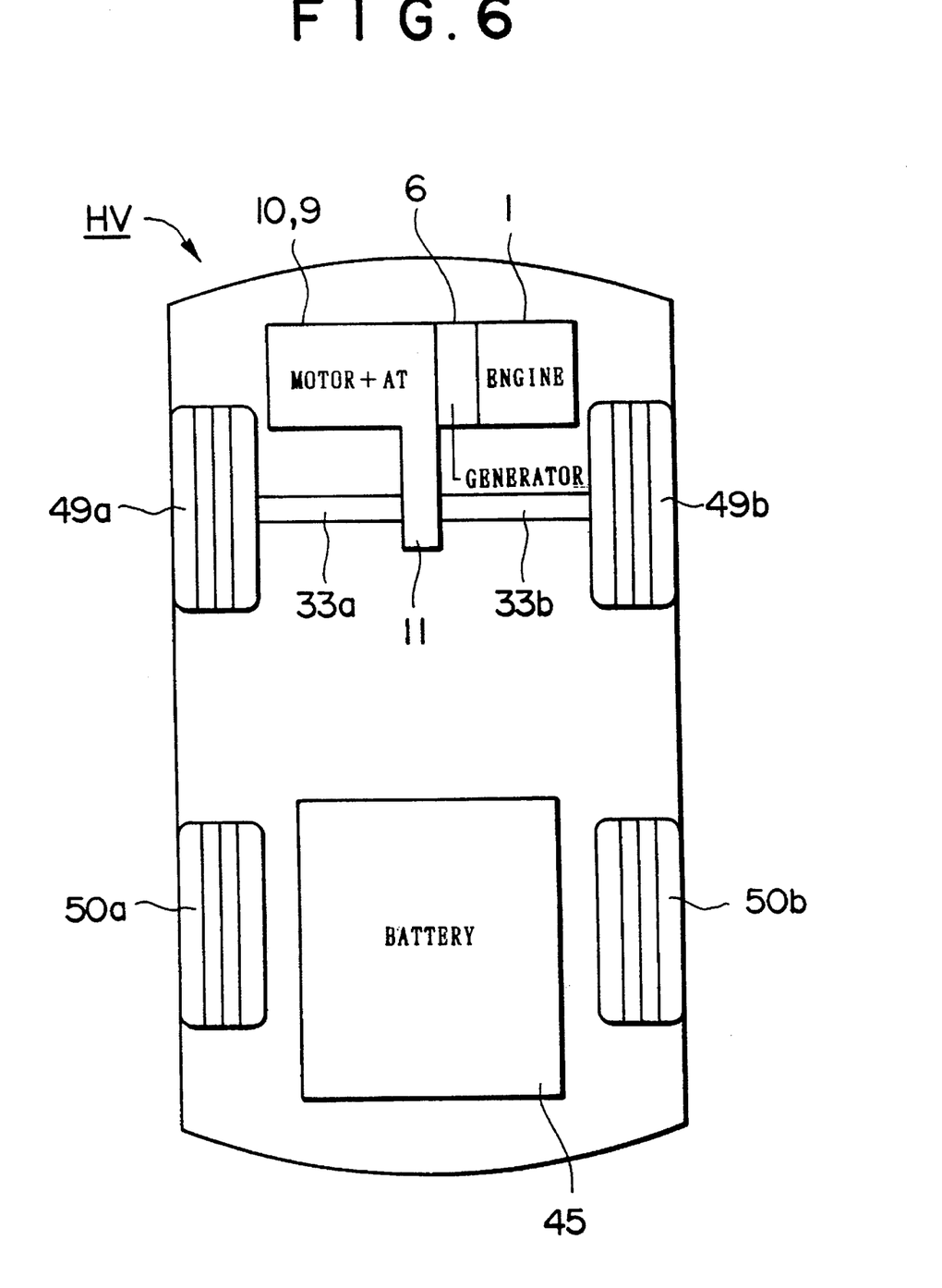
FIG. 6 is a schematic view illustrating an arrangement of the hybrid unit and a battery in a hybrid vehicle.

FIG. 8 is a plan view schematically showing the hybrid vehicle according to the present invention in an arrangement wherein the engine 1, the generator 6, the electric motor 10 and the automatic transmission unit 9 are all installed transversely in the engine compartment, in this order, with a differential gear unit 11 mounted via the counter gear arrangement 29, 30, 31 located in about the center of the whole. As has been described above, the differential gear unit 11 is centrally located between the driving shafts 33a and 33b to transmit rotation to the front wheels 49a and 49b. The battery 45 is located at the rear of the vehicle between rear wheels 50a and 50b (see FIG. 6).

The invention facilitates an operative sequence as will be explained in more detailed below.

In normal operation, the clutch 7 is released to isolate the rotation of the intermediate shaft 21 from that of the shaft 17 driven by the engine 1. The engine 1 is occasionally started by operation of a switch control by an operator for running at a constant speed, determined to suppress exhaust gas while achieving high efficiency, both in short stops and in running. The rotation of the engine 1 is transmitted to the rotor 15 of the generator 6 via the damper 13 to generate a predetermined electrical current in the stator coil 12. The thus-generated electrical power is stored in the battery 4 via the converter 46. The rotation of engine 1 also produces an oil pressure by driving the oil pump housed in the case 19, via the boss 15a.

The electrical current from the battery 45 and/or converter 46 is supplied to the electric motor 10 via the inverter 47 responsive, for example, to operation of an accelerator pedal. The speed of rotation of the rotor 27 of the electric motor 10 is changed by the automatic transmission unit 9 based on the throttle opening and the speed of travel and thereafter transmitted to the output shaft 22. More particularly, in first speed, the direct clutch C2 is released but the one-way clutch F is engaged. The rotation of the rotor 27 drives the ring gear R which, in turn, drives the pinion P of the carrier CR at a relatively reduced speed to thereby rotate the output shaft 22 as the under-drive mode. In regenerative braking, the brake B is operated to stop the sun gear S so that the rotation of the output shaft 22 is transmitted to the rotor 27.

In second speed, the direct clutch C2 is engaged so that the motion of the sun gear S is integrated with that of the carrier CR to thereby rotate the gear unit 25, which results in an integral rotation of the rotor 27 and the output shaft 22.

The thus-rotated output shaft 22 drives the counter drive gear 23, the counter driven gear 30 and the pinion gear 31, in succession, and this rotation is finally transmitted to the differential gear unit 11 to rotate the front wheel shafts 33a and 33b.

Under a high load torque when starting, accelerating or climbing, the automatic transmission unit 9 maintains first speed to maximize the torque from the electric motor 10. For high speed cruising, the automatic transmission unit 9 shifts to the second speed state, under conditions where the electric motor 10 will not be required to cope with any high load torque.

As has been mentioned above, this embodiment is a series type assembly which normally drives the vehicle by the electric motor 10 but, when the electric motor 10 is out of order or the vehicle is to be run at a high speed on a highway, the clutch 7 is activated, either by the operator or automatically, whereby the output of the electric motor 10 is converted to an arrangement in parallel with the engine output. In this state, the rotation of the output axle 1a is not only transmitted to the rotor 15 via the damper 13, but also to the intermediate shaft 21 via the spline shaft 17 and the engaged clutch 7, with input to the ring gear R of the automatic transmission unit 9. It is therefore possible not to use the electric motor 10 while the rotation of the engine 1 is being transmitted to the automatic transmission unit 9.

Figure 3:
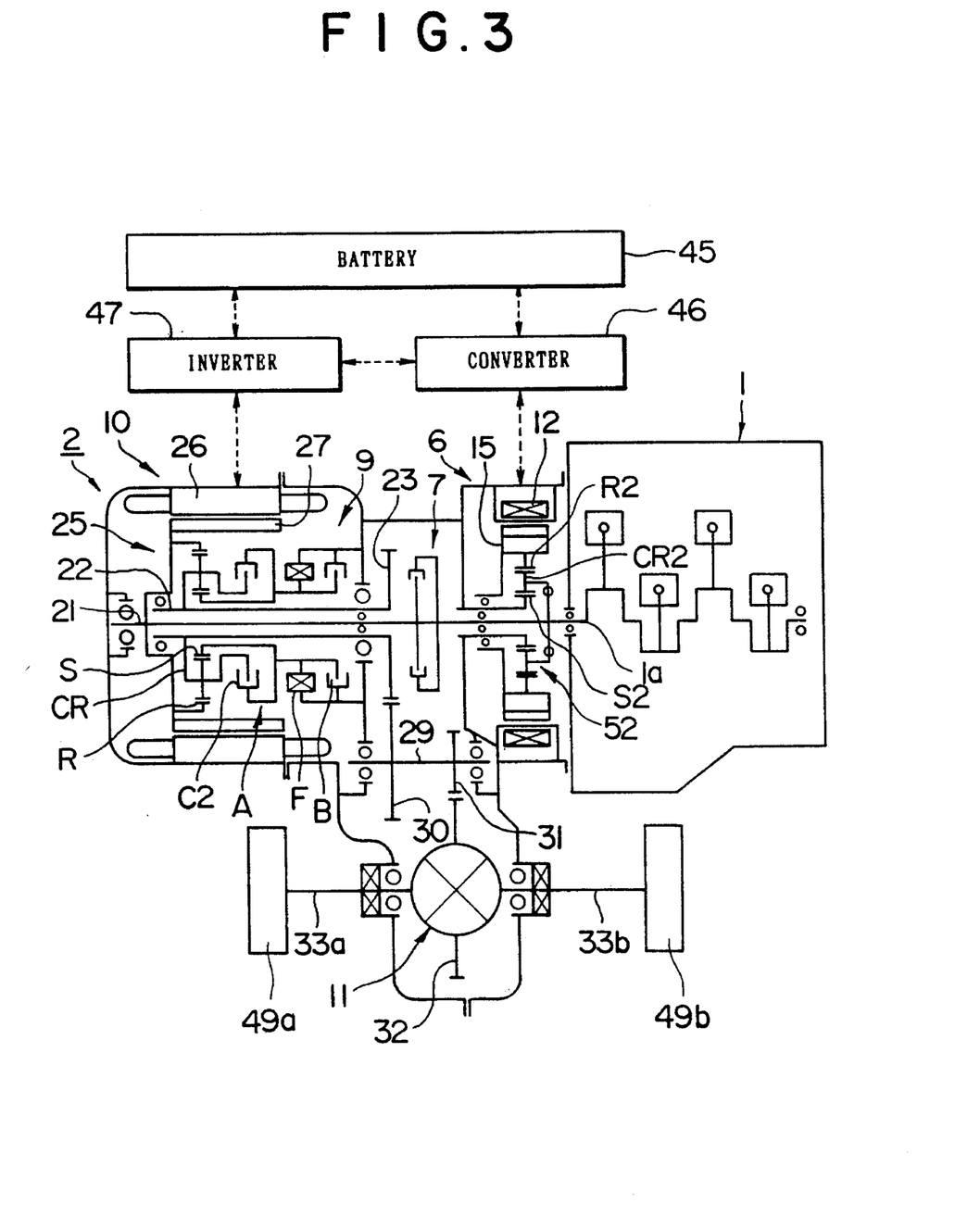
FIG. 3 is a schematic view of the hybrid unit according to a second embodiment of the present invention.
Figure 4:
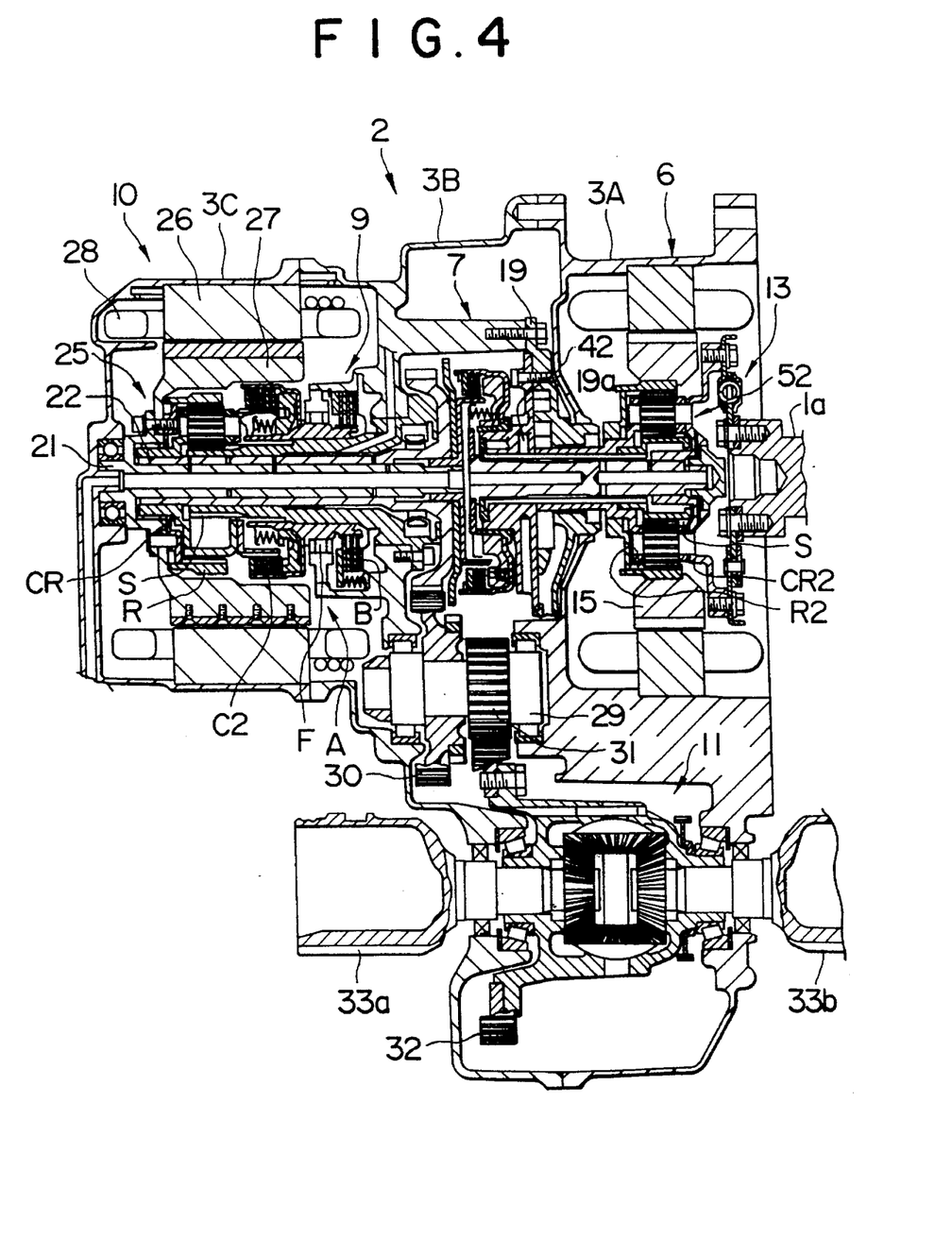
FIG. 4 is a sectional view of the second embodiment.

FIGS. 3 and 4 depict a second embodiment according to the present invention. Incidentally, in the description of the following embodiments, the same reference numerals will be used to designate the same or similar components as those in the first embodiment, so that the description will be omitted or simplified.

The difference between this second embodiment and the first embodiment is in the addition of a speed increasing gear assembly 52 in the generator 6. The speed increasing gear assembly is a single planetary gear unit by which the output of shaft 1a of the engine 1 is transmitted to the carrier CR via a damper 13, the ring gear R2 is connected to the rotor 15 and the sun gear S2 is secured on the pump case 19 via the sleeve 19a. The carrier CR2 is slipped over the spline shaft 17.

Figure 5:
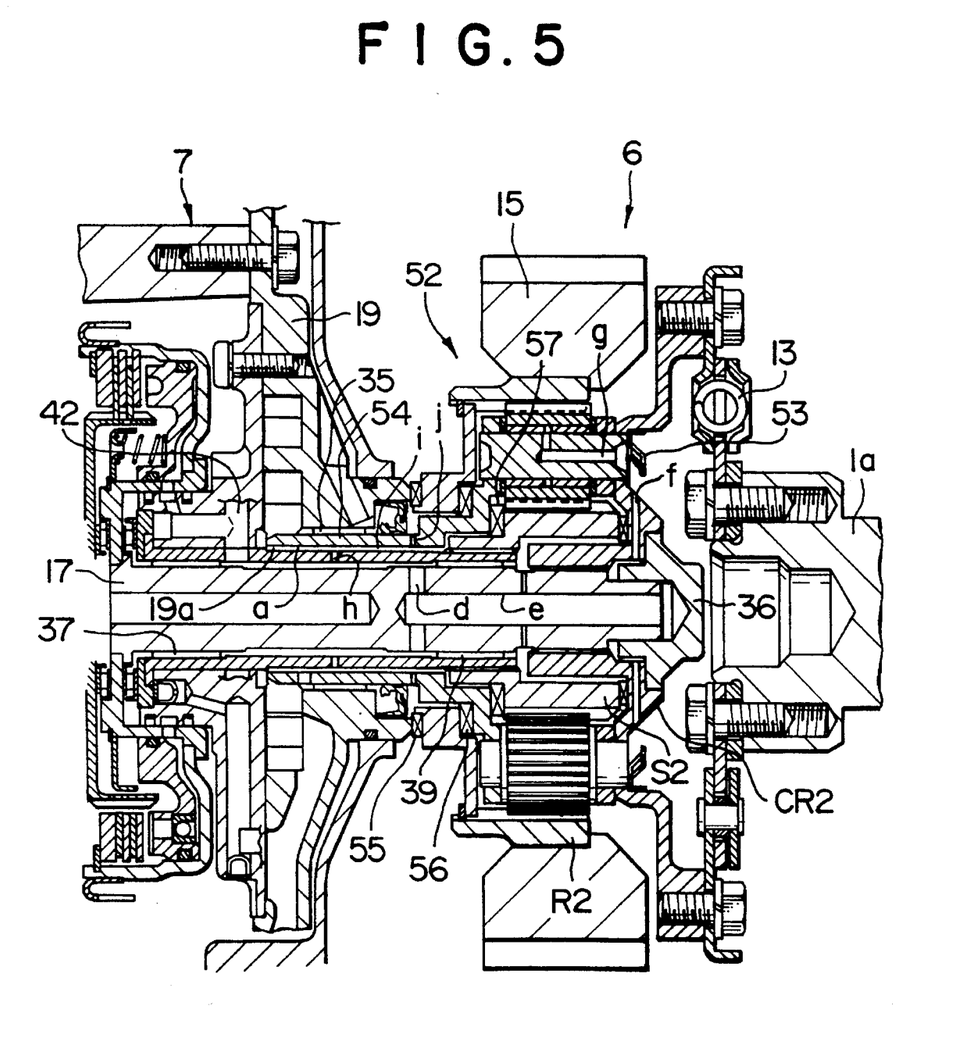
FIG. 5 is a sectional view of a generator in combination with a planetary gear assembly.

As shown in FIG. 5, the lubricating oil from the lubricating oil path 42 from the pump housed in case 19 is fed to a carrier oil path f of the planetary gear unit 52 through the aperture a between the spline shaft 17 and the sleeve 19a and the oil path d, e of the shaft 17 and then fed into the oil path g of the pinion shaft via an oil pan 53. The lubricating oil is also fed to the sliding bearing 37 from the aperture a, fed to the sliding bearing 35 through the hole b, supplied to an aperture i between the sleeve 10a and the boss 54 through the hole h and fed to the bearings 55, 56, 57 via the oil path j.

Accordingly, the rotation of the output shaft 1a of the engine 1 is transmitted to the carrier CR2 of the speed-=increasing gear assembly 52 via damper 13. The speed-increasing gear assembly 52 accelerates the rotational speed of the ring gear R2 because the sun gear S2 is temporarily stopped, the rotor 15 connected to the ring gear R2 is accelerated relative to the coil 12. Accordingly, the generator 6 generates a high voltage to charge the battery 45 via the converter 46. The speed-increasing gear assembly 52 is located inside of the rotor 15 without changing the dimensions of the generator 6 to allow for preferred lubrication and cooling.

The speed-increasing gear assembly 52 may be of a double-pinion planetary gear unit instead of the single planetary gear unit used in the above mentioned embodiments.

The automatic transmission unit 9 provided intermediate the rotor 27 of the electric motor 10 and the drive gear 23 could be omitted and the rotor 27 of the electric motor 10 may be connected to the gear 23 directly or via a reduction gear unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hybrid vehicle, comprising:
  (a) an internal combustion engine having output at an engine shaft;
  (b) a generator connected to said engine shaft, said generator including:
    a first stator; and
    a first rotor rotatably mounted coaxially with said first stator;
  (c) an electric motor axially aligned with said engine shaft and including:
    a second stator; and
    a second rotor rotatably mounted coaxially with said second stator;
  (d) an output gear assembly connected to an output shaft driven by said second rotor and located between said generator and said electric motor;
  (e) a clutch adapted to connect and disconnect said engine shaft to/from said second rotor;
  (f) a differential gear unit driven by said output gear assembly; and
  (g) a counter shaft oriented in parallel with the output shaft, said counter shaft including gears for transmitting torque from said output gear assembly to said differential gear unit.

2. The hybrid vehicle according to claim 1, wherein said output gear assembly is provided with an automatic transmission unit after said second rotor for changing the speed of the rotation of said second rotor and for transmitting the rotation to the output shaft.

3. The hybrid vehicle according to claim 2, wherein the automatic transmission unit includes at least one planetary gear unit.

4. The hybrid vehicle according to claim 3, wherein the automatic transmission unit is arranged as an under-drive unit.

5. The hybrid vehicle according to claim 2, wherein the automatic transmission unit includes a hydraulic wet clutch.

6. The hybrid vehicle according to claim 1, wherein the engine shaft is connected with said first rotor through a damper.

7. The hybrid vehicle according to claim 1, wherein said generator includes a speed-increasing gear assembly located in its interior, for increasing the speed of rotation received from the engine shaft and for transferring the rotation at the increased speed to said first rotor.

8. The hybrid vehicle according to claim 7, wherein the speed-increasing gear assembly of said generator is a planetary gear unit.

9. The hybrid vehicle according to claim 7, wherein the engine shaft is connected with the speed-increasing gear assembly of said generator through a damper.

10. The hybrid vehicle according to claim 1, wherein the radial dimension of said output gear assembly located between said generator and said electric motor is smaller in size than corresponding dimensions of both of said generator and said electric motor.

11. The hybrid vehicle according to claim 1, wherein said generator, said electric motor and said output gear assembly are all housed together in one integral case.

12. The hybrid vehicle according to claim 11, wherein the integral case is abutted against said internal combustion engine.

13. The hybrid vehicle according to claim 12, wherein the integral case has three defined sections, the first section housing said generator, the second section housing said output gear assembly, and the third section housing said electric motor.

14. The hybrid vehicle according to claim 13, wherein said first stator is fixed to the first section of the case.

15. The hybrid vehicle according to claim 13, wherein said second stator is fixed to the third section of the case.

16. The hybrid vehicle according to claim 1, wherein said clutch is a hydraulic wet clutch.

17. A hybrid vehicle comprising:
  drive wheels for propelling the vehicle;
  a differential unit for transmitting torque to the drive wheels;
  an internal combustion engine having torque output at an engine shaft;
  an output gear for transmitting torque to said differential unit;
  a clutch for selectively connecting said engine shaft to said output gear;
  a battery for storing electric power;

a generator, driven off of said engine shaft, for charging said battery;

an electric motor, powered by said battery, for transmitting torque to said output gear, said motor including a rotor;

wherein said internal combustion engine is axially aligned with, in succession, said generator, said clutch, said output gear and said electric motor.

18. The hybrid vehicle according to claim 17 wherein said engine shaft is continuously rotated at a constant speed.

19. The hybrid vehicle according to claim 17 additionally comprising:

an intermediate shaft connected to said clutch for receiving torque from said internal combustion engine and fixed to said rotor for receiving torque from said motor;

an output shaft coaxial with and rotatable supported by said intermediate shaft, said output shaft being fixed to said output gear; and a transmission unit for transmitting torque from said intermediate shaft to said output shaft and for changing the speed of the transmitted torque.

* * * * *

UNITED STATES PATENT AND TRADEMARK OFFICE
CERTIFICATE OF CORRECTION

PATENT     : 5,513,719

DATED      : May 7, 1996

INVENTOR(S): Shuzo Moroto et al

It is certified that error appears in the above-identified patent and that said Letters Patent is hereby corrected as shown below:

The title page showing the illustrative fiugre should be deleted to be replaced with the attached title page.

In the drawings, sheets 1 and 3, consisting of Figs. 1 and 3, should be deleted to be replaced with the sheets of drawings, consisting of Figs. 1 and 3, as show on the attached pages.

Signed and Sealed this

Thirty-first Day of March, 1998

*Attest:*

BRUCE LEHMAN

*Attesting Officer*    *Commissioner of Patents and Trademarks*

United States Patent [19]
Moroto et al.

[11] Patent Number: 5,513,719
[45] Date of Patent: May 7, 1996

[54] HYBRID VEHICLE

[75] Inventors: Shuzo Moroto; Kozo Yamaguchi; Shigeo Tuzuki; Yoshinori Miyaish, all of Aichi, Japan

[73] Assignee: Kabushikikaisha Equos Research, Japan

[21] Appl. No.: 202,599

[22] Filed: Feb. 28, 1994

[30]  Foreign Application Priority Data

May 24, 1993 [JP] Japan ................... 5-145767

[51] Int. Cl.⁶ .................................................. B60L 11/14
[52] U.S. Cl. ........................ 180/65.4; 180/65.6; 60/718
[58] Field of Search ............................. 180/65.3, 65.4, 180/65.6, 65.7, 65.2, 69.6; 60/713, 716, 718; 123/2, 3

[56] References Cited

U.S. PATENT DOCUMENTS 5,323,868  6/1994  Kawashima ........................ 180/65.4
5,327,992  7/1994  Boll .................................... 180/65.2
5,343,970  9/1994  Severinsky ......................... 180/65.6
5,346,031  9/1994  Gardner .............................. 180/65.4

FOREIGN PATENT DOCUMENTS

0528412  2/1993  European Pat. Off. ........... 180/65.4
4124479  1/1993  Germany ............................ 180/65.4
4297330  10/1992  Japan .

*Primary Examiner*—Anne Marie Boehler
*Attorney, Agent, or Firm*—Lorusso & Loud

[57] ABSTRACT

A hybrid vehicle having an internal combustion engine, a generator connected with an output shaft extending from the internal combustion engine, an electric motor axially aligned with the output shaft, an output gear assembly connected to an output shaft driven by the rotor of the electric motor and positioned between the generator and the electric motor, a clutch adapted to connect and disconnect the generator to/from the output gear assembly, a differential gear unit, and a counter shaft oriented in parallel the output shaft driven by the rotor.

19 Claims, 6 Drawing Sheets

FIG. 1

FIG.3